May 10, 1960   J. P. M. VAN DEN BERG ET AL   2,935,829
COIN OPERATED VENDING MACHINE
Filed Jan. 27, 1958   9 Sheets-Sheet 1
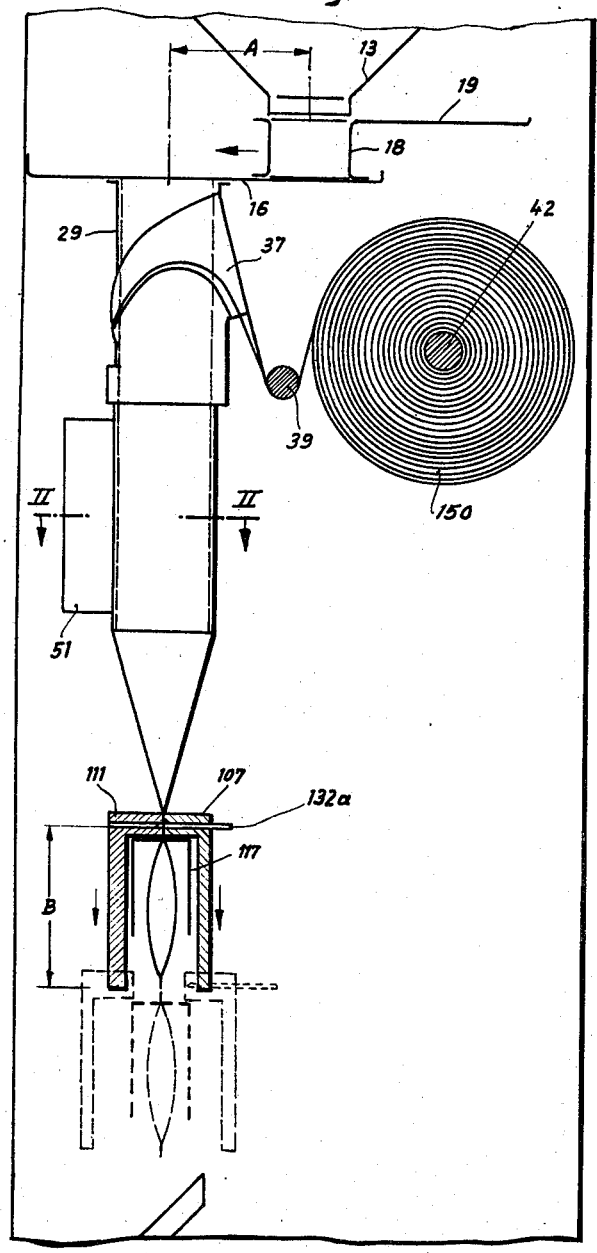
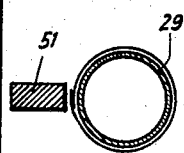
INVENTORS
J. P. M. van den BERG
A. P. J. van de VEN.
J. H. van den EIJNDEN.

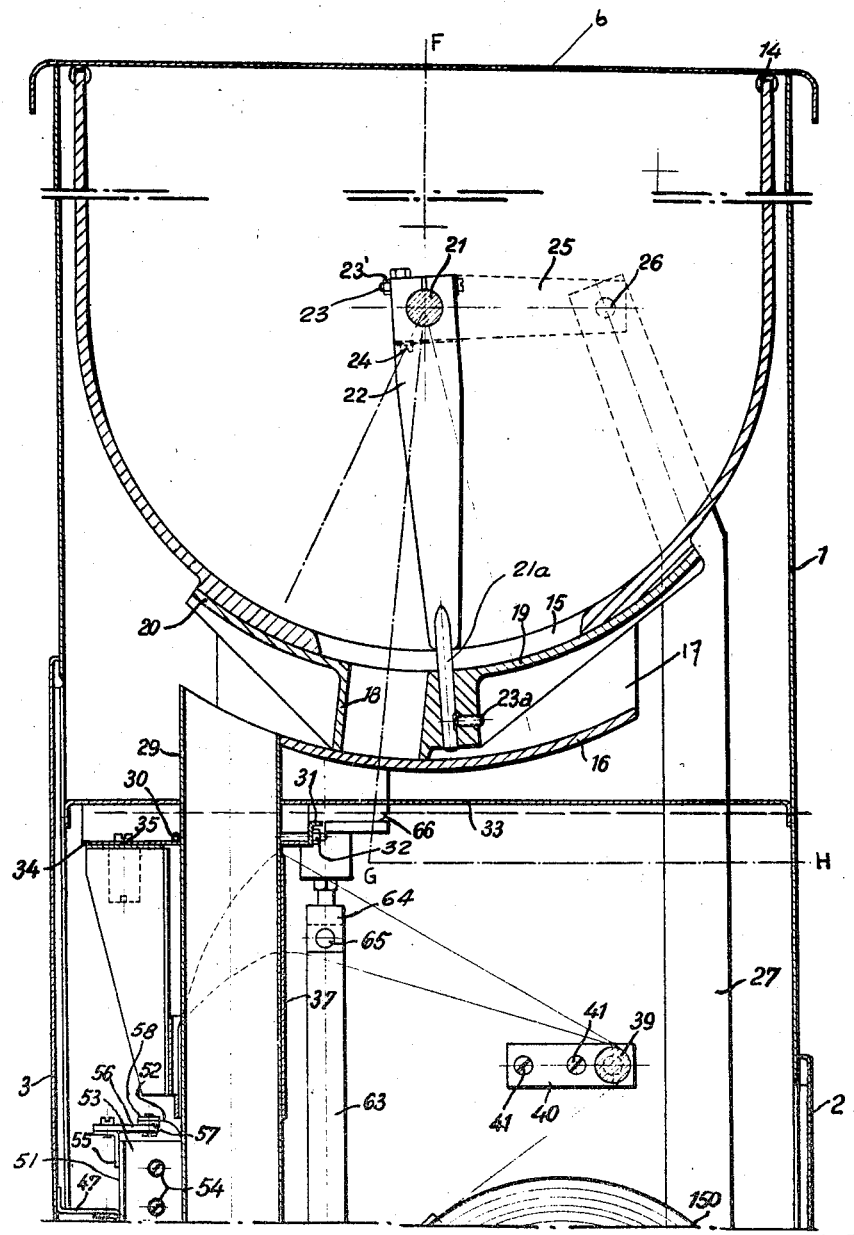

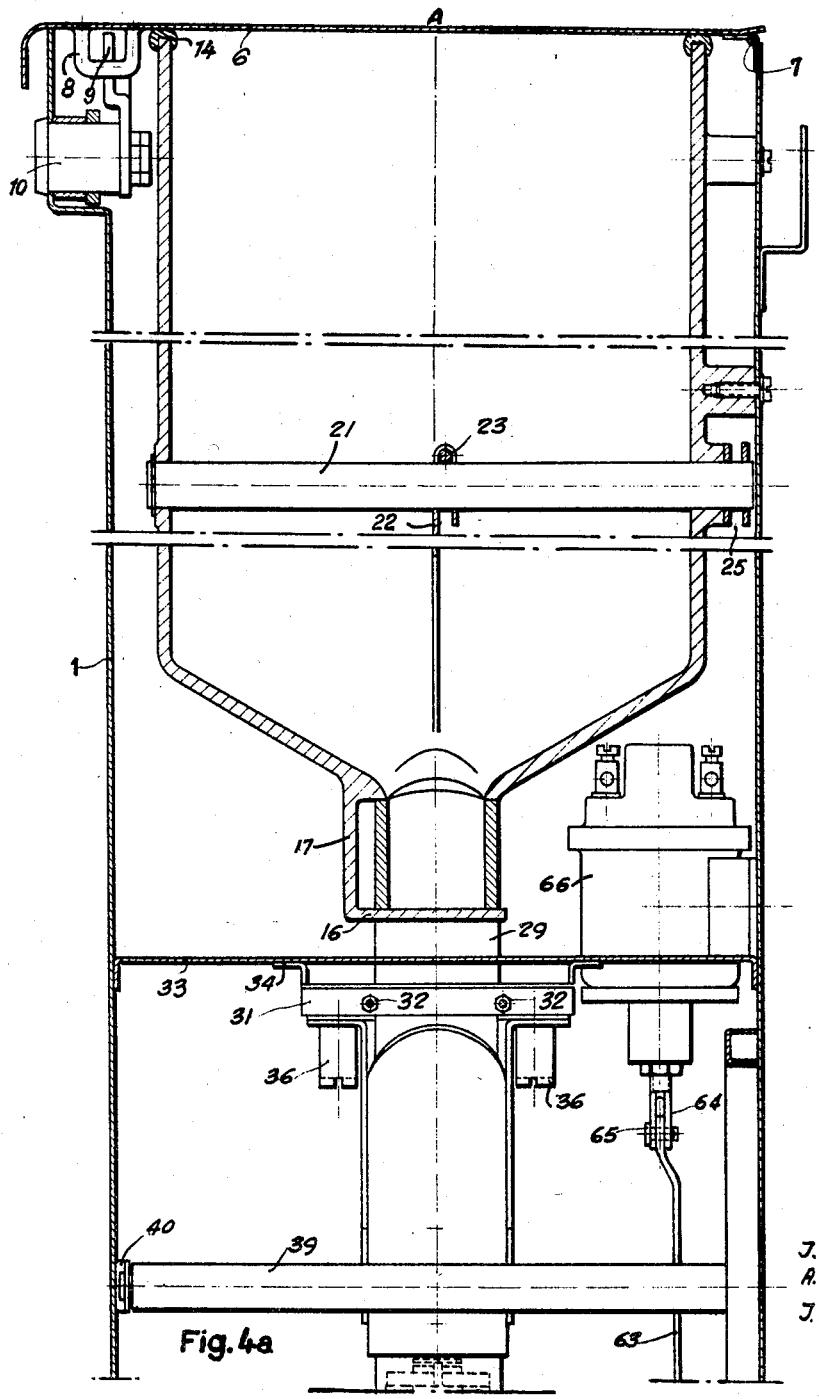

May 10, 1960 J. P. M. VAN DEN BERG ET AL 2,935,829
COIN OPERATED VENDING MACHINE
Filed Jan. 27, 1958 9 Sheets-Sheet 6

INVENTORS
J. P.M. van den BERG
A.P.J. van de VEN.
J.H. van den EIJNDEN

May 10, 1960  J. P. M. VAN DEN BERG ET AL  2,935,829
COIN OPERATED VENDING MACHINE
Filed Jan. 27, 1958  9 Sheets-Sheet 7
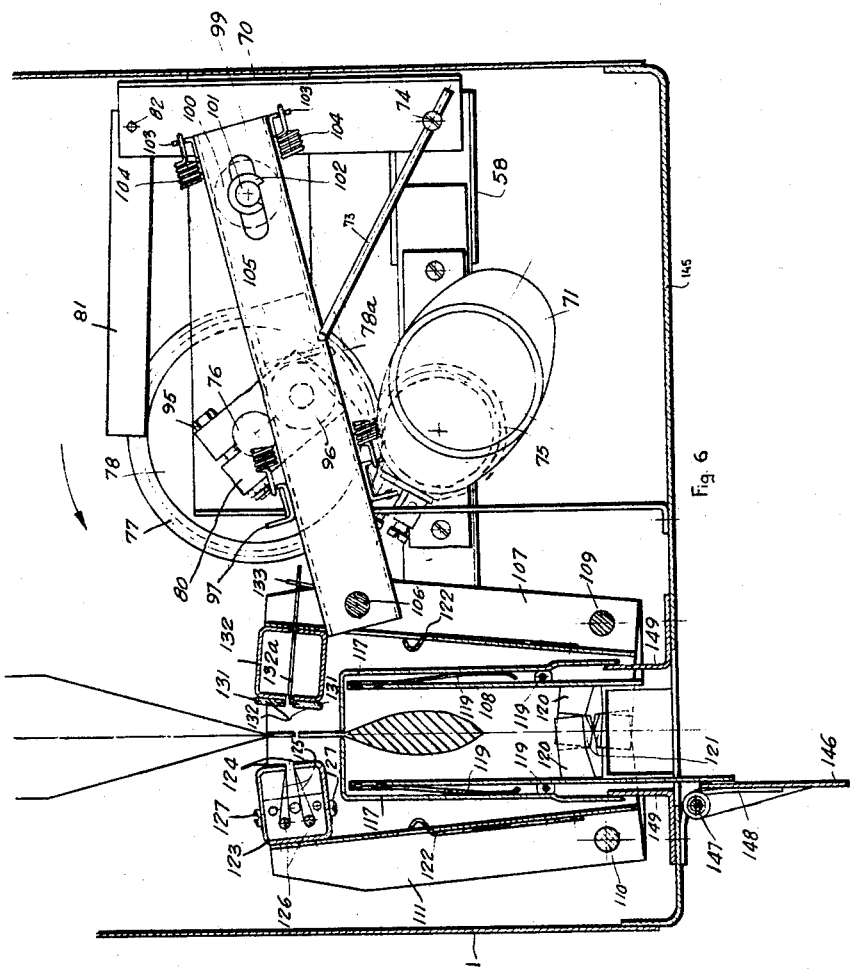
INVENTORS
J. P.M. van den BERG
A. P.J. van de VEN.
J.H. van den EIJNDEN.

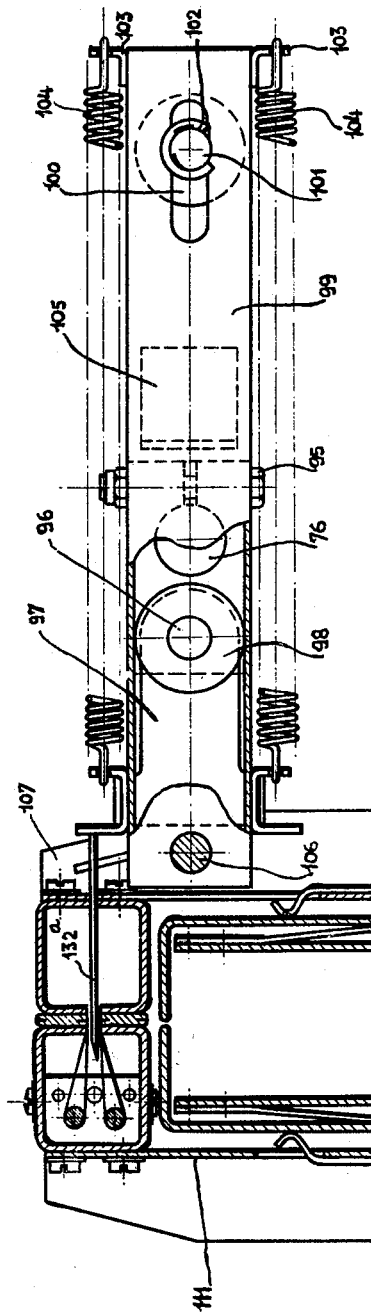

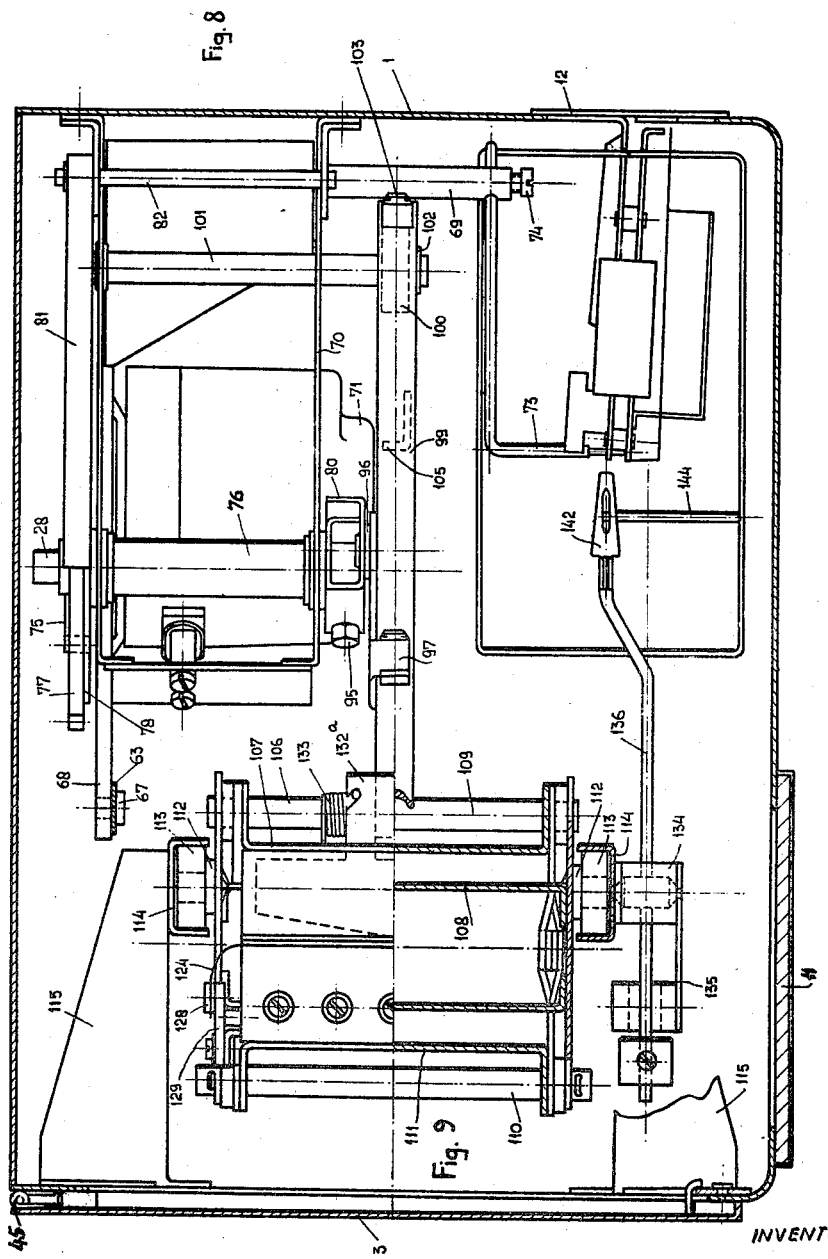

United States Patent Office 2,935,829
Patented May 10, 1960

2,935,829

COIN OPERATED VENDING MACHINE

Jacob P. M. van den Berg, Adrianus P. J. van de Ven, and Johannes H. van den Eynden, Weert, Netherlands; said Van den Eynden assignor to said Van den Berg and Van de Ven Application January 27, 1958, Serial No. 711,402

Claims priority, application Netherlands January 25, 1957

10 Claims. (Cl. 53—182)

The present invention relates to a coin-operated vending machine for vending dosed and packaged material which is being sold in form of pieces, powder or liquid in a bag or the like.

Coin-operated vending machines for this purpose are known which comprise a container having stored therein the material to be sold. Devices of this type are also known which are equipped with a dosing or measuring device for the non-packed material and with feeding means by means of which the packaging material is brought into a position in which the material to be sold is filled into the respective packaging material or container.

With the heretofore known coin-operated vending machines, the movement of the individual elements is to a great extent effected independently of each other so that a considerable number of levers, links and actuating means is required which greatly complicates such vending machines.

It is, therefore, an object of the present invention to provide a vending machine of the above mentioned type, which will be greatly simplified over heretofore known coin-operated vending machines of the type involved.

It is another object of this invention to provide an improved and simplified coin-operated vending machine, in which the material to be sold is stored in a storage container from which the quantities to be sold are individually withdrawn and filled into a bag or the like which latter is then sealed and dispensed.

These and other objects and advantages of the invention will appear more clearly from the following specification in connection with the accompanying drawings, in which:

Fig. 1 is a diagrammatic illustration of the principle of a vending machine according to the present invention.

Fig. 2 likewise diagrammatically illustrates a portion of the vending machine according to Fig. 1.

Figure 4B:
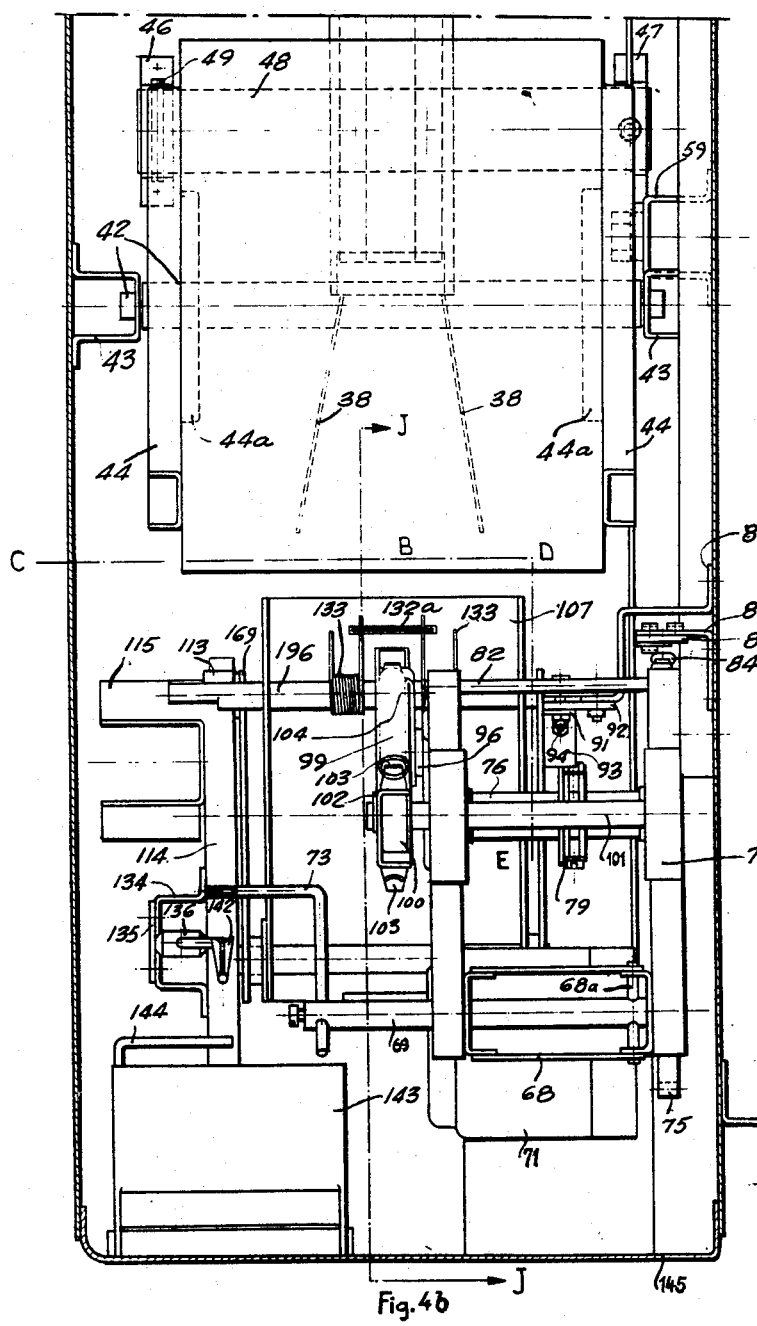
Fig. 4 (a and b) is a side view of the vending machine according to the present invention and partly represents a section taken along the line F—G—H of Fig. 3 (a and b).

Fig. 6 likewise represents a section along the line J—J of Fig. 4b but showing the control beam controlling the movement of the transverse seam member in its lowermost position.

Fig. 7 is a partial section along the line J—J of Fig. 4b with the transverse seam member and the knife shown in the position in which the cutting operation is being effected.

Figure 3B:
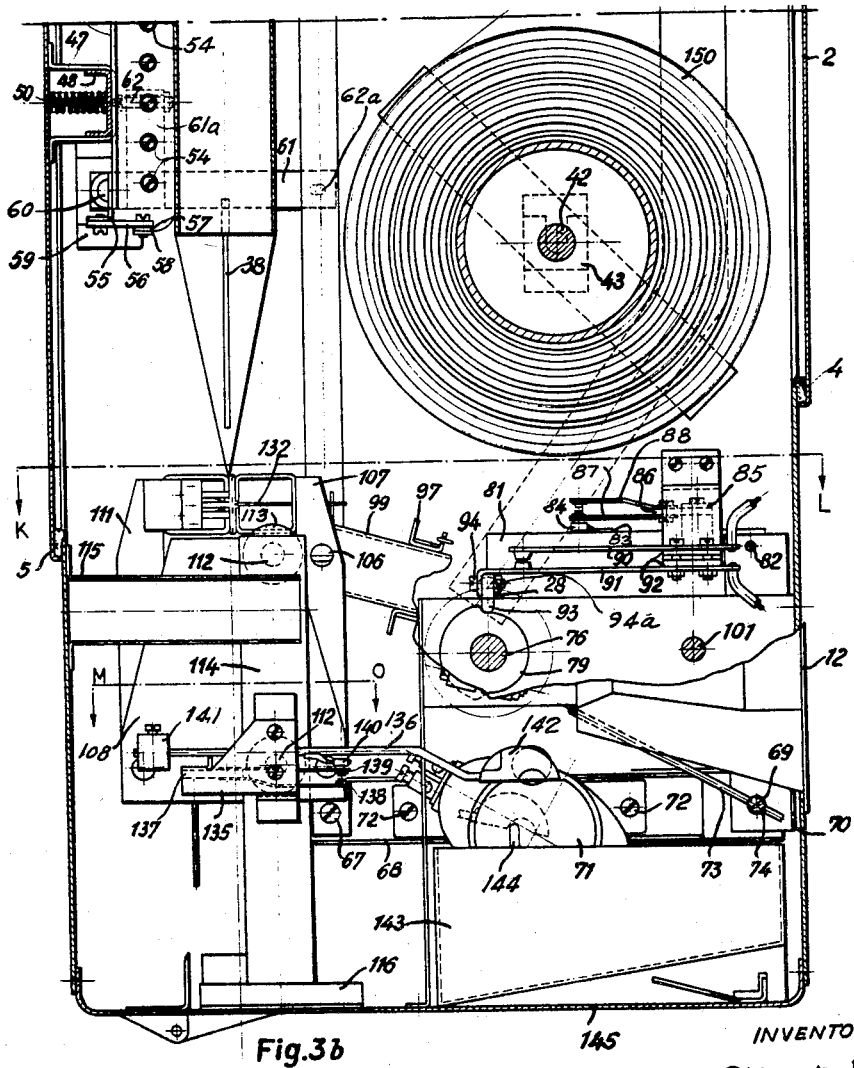
Fig. 3 (a and b) is a more elaborate side view of the vending machine and partly represents a section taken along the lines A—B—C and C—D—E of Fig. 4 (a and b).

Fig. 8 is a section along the line K—L of Fig. 3b.

Fig. 9 is a section along the line M—O of Fig. 3b.

The vending machine according to the present invention is characterized primarily in that a pull rod actuated by a magnet, relay or the like is adapted on one hand to move the member for the longitudinal welding seam, and on the other hand through the intervention of a tiltably mounted motor and a distributor shaft to move and actuate the dosing or measuring cylinder, the member which produces the transverse closing seam, a gripper, a cutting knife and the contacts for the welding wires.

Referring now to the drawings in detail, the vending machine according to the present invention comprises a housing 1 (Fig. 3a) provided with two side doors 2 and 3 which by means of sealing strips 4, 5 properly seal the housing 1. The top of the housing 1 is closed by a lid 6 (Fig. 4a) which is linked to one of the side walls of the housing by means of a hinge 7 and has its opposite or free end equipped with a yoke-like member 8 adapted to be engaged by a hook 9 of a lock 10 connected to the outside of the vending machine. The front side of the housing has a window 11 (Fig. 9) for checking the proper operation of the vending machine. On the right-hand side of the vending machine there is arranged a coin checker 12 (Figs. 3b and 9) of any standard type as it is known in connection with coin-operated vending machines.

The upper space within the housing 1 is occupied by a container 13. The upper edges of the container 13 are provided with a sealing strip 14 on which the lid 6 rests in a sealing manner when the lid is in its closing position. The lower end of the container 3 has an elongated opening 15 and has connected thereto a connecting member 17 (Fig. 4a) with a closing ledge 16. Between the opening 15 and the closing ledge 16 a dosing cylinder 18 is movably mounted which cylinder may be provided with sealing lips 19, 20. The cylinder 18 is adapted to rotate about the shaft 21 (Fig. 3a). To this end, an arm 22 is connected to shaft 21 by means of a clamping bolt 23 and a nut 23'. The arm 22 ends in a cylindrical portion 21a to which the dosing or measuring cylinder 18 is connected in any convenient manner for instance by a set screw 23a.

The shaft 21 has furthermore clamped thereto a lever arm 25 which is pivotally connected to a link 27 by means of a pivot 26. The lower end of the link 27 carries a pivot 28 (Figs. 3a and 8) which is connected with the driving mechanism which latter will be explained further below.

The vending machine according to the present invention furthermore comprises a filling pipe 29 (Fig. 3a) which is offset with regard to the elongated opening 15. The filling pipe 29 which is directly adjacent the closure ledge 16 is by means of a looping wire 30 and holding screws 32 connected to a supporting member 31 and thereby to the supporting plate 34. The plate 34 is connected to an intermediate plate 33. The central portion of the filling pipe or filling tube 29 is equipped with a member 37 of a type known per se which serves to bring the strip-like bag material into the proper position and shape for forming the bag which will eventually serve as container for the dispensed goods. The filling pipe 29 extends with some play through the member 37 which latter by means of two bolts 35 and nuts 36 is connected to the plate 34. The lower end of the filling pipe 29 carries a two-part spreader 38 which serves to hold the foil, which is provided with a longitudinal seam and which is initially cylindrical, in a flat position.

The strip-shaped bag material passes over a roller 39 from the storage spool 150 to the member 37. The roller 39 is supported by a bearing 40 which is connected to the housing 1 by means of screws 41. The spool 150 is rotatable about a shaft 42 which is connected to the housing 1 by means of a bearing 43. The shaft 42 supports spool holders 44 which are provided with a cylindrical extension 44a and can easily be taken off.

The door 3 of the housing which door is tiltably connected to the housing by means of the hinge 45 (Fig. 8) has connected thereto two supporting members 46, 47 (Fig. 3b) of U-shaped cross section between which a bridge member 48 is arranged. This bridge member 48 (Fig. 4b) is rotatably journalled on the supporting members 46, 47 and by means of a spring 50 (Fig. 3b) is pressed against the central portions of said supporting members 46, 47. The bridge member 48 has connected thereto a member 51 for producing the longitudinal seal or seam in the bag or the like in which the goods are dispensed. The said member 51 has a flat resistance wire 52 which in insulated condition is arranged between two heat resistant fabric pieces 53. These fabric pieces are by means of screws 54 connected to the member 51, whereas the ends of the resistance wire 52 are mounted on insulating strips 56 by means of clamping members 57 and 58. The said insulating strips are screwed to angled hooks 55 connected to the member 51.

The inner side of the housing carries a bearing support 59 at the level of the lower portion of the welding member 51. A two-arm lever 61, 61a is journalled in said bearing support by means of a bolt 60. The lever arm 61 is by means of a pivot 62a connected to a pull rod 63, whereas the lever arm 61a carries an adjusting screw 62 which with low play extends through a bore in the holder 47 and rests against the bridge member 48.

One end of the pull rod 63 is by means of a lever 64 connected with a pivot 65 of a lifting magnet 66, whereas the other end of the pull rod 63 is by means of a bolt 67 rotatably connected to a frame-shaped arm 68. The frame-shaped arm 68 is by means of a shaft 69 rotatably suspended which shaft 69 is journalled in a frame 70 connected to the housing 1. The arm 68 engages the shaft 69 by means of transverse pins 68a. Shaft 69 supports a blocking rod 73 which by means of a cylinder screw 74 is connected to the shaft 69.

The frame-shaped arm 68 has bolted thereto by means of two bolts 72 a direct current motor 71 the shaft of which has connected thereto a gear 75. Above the arm 68 within the frame 70, there is journalled a shaft 76 (Figs. 5, 6 and 8) which has connected thereto a gear 77 with a ratchet wheel 78 provided with a recess 78a, a cam disc 79 and a crank 80. Within frame 70, a pawl 81 is tiltably mounted on a shaft 82. The pawl 81 carries a cam 83 which is provided with an insulating rubber cover 84. The housing 1 has furthermore connected thereto an angular member 85 to which two contact holders 87, 88 are connected through the intervention of insulating strips 86. Laterally adjacent the said contact holders there is mounted a double angle member 89 which is likewise connected to the housing 1. The free end of the member 89 carries contact holders 90, 91 through the intervention of two insulating strips 92. The end of the contact holder 91 is bent downwardly and has mounted thereon a cam 93 by means of a screw 94 and nut 94a.

Figure 5:
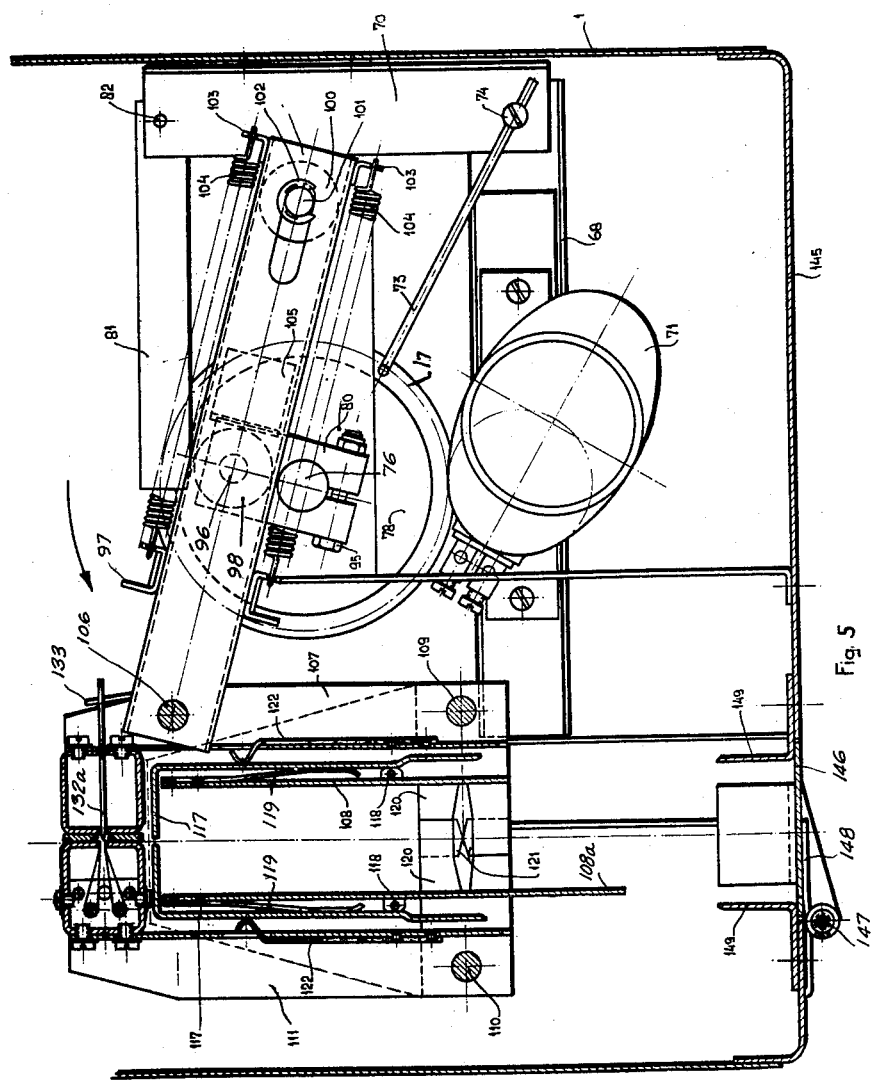
Fig. 5 is a section taken along the line J—J of Fig. 4b.

The crank 80 is by means of clamping bolt 95 connected to the shaft 76 and has its free end provided with a pivot 96 rotatably supporting a roller 98. Also connected to the shaft 96 is a spring slide 97. The roller 98 rolls in the central portion of a U-shaped control beam 99 while a second roller 100 rolls in the end portion of the U-shaped control beam 99. The roller 100 is journalled on the shaft 101 which is supported by the frame 70. A washer 102 holds the control beam 99 in its position and prevents a lateral escape thereof. That end of the control beam 99 which carries the roller 100 has two spring lips 103 (Figs. 5, 6 and 7) having hooked therein one end of two tension springs 104 the other ends of which engage the spring slide 97 which is reciprocable on the control beam 99. An abutment 105 is connected to the central portion of the control beam 99. Through the intervention of a shaft 106, the control beam 99 is connected with the right-hand holding member 107 which by means of a shaft 109 is connected to a carriage 108. The left-hand holding member 111 is likewise connected to said carriage, namely by a shaft 110. The carriage 108 is equipped with four pivots 112 having rotatably mounted thereon rollers 113 which guide the carriage in tracks 114. The tracks 114 are held in the housing 1 by means of supporting members 115 and connecting strips 116. Furthermore, gripping members 117 are rotatably mounted on pivots 118 of the carriage 108. The gripper members 117 are acted upon by springs 119 connected to the carriage 108. The right-hand holding member 107 and the left-hand holding member 111 are provided with hinge plates 120 equipped with pressure members 121. These pressure members 121 are adapted to convey the movement, which is imparted by the control arm 99 to the holding member 107, to the holding member 111. Each of two leaf springs 122 are connected to the holding member 107 and the holding member 111. Each of the holding members 107 and 111 has its upper portion provided with welding elements 123 and 130 respectively. The welding element 123 has two flat resistant wires 124 (Fig. 6) which are arranged between the inner sides of two fabric pieces 125, preferably a fabric known as the name "Teflon." Each of these fabric pieces passes around a bolt 126 and by means of cylinder screws 127 is held on the outside of the member 123. The ends of the resistant wires 124 are clamped between two insulating discs 128 which are mounted on an insulating plate 129. The insulating plate 129 is in its turn connected to the member 123. The right-hand holding member 107 carries a member 130 provided with two U-shaped holders 131. Rubber strips 132 are slipped over the said U-shaped holders 131, the oppositely located lateral edges of said strips 132 being spaced from each other. A cutting knife 132a extends through an opening in the member 130 and between the rubber strips 132. When the cutting knife 132a occupies its cutting position, it will be in the position illustrated in Fig. 7, whereas Figs. 5 and 6 illustrate said cutting knife in its withdrawn position or inactive position. Two torsion springs 133 are looped around the shaft 106, one end of each of said torsion springs engaging a recess of the knife 132a.

A yoke-shaped member 134 is connected to one of the guiding tracks 104 and has mounted thereon a bearing plate 135. A coin scale 136 is rotatably journalled between plate 135 and said guiding track. The plate 135 has furthermore connected thereto an insulating strip carrying two contact holders 138, 139 (Fig. 3b). The coin scale 136 is equipped with a cam which is covered by a rubber cover 140. One end of the coin scale 136 carries the adjustable counterweight 141. The other end of the coin scale ends at the coin holder 142 which is located above the coin holder 143 which latter is equipped with an ejector 144. At the bottom 145 of the housing 1 there is arranged a flap 146 adapted to be tilted about a shaft 147, said flap or cover 146 being held in its closing position by a torsion spring 148. Laterally adjacent the dispensing opening for the goods which is closed by the flap 146, angle members 149 are provided the upwardly directed portion of which cooperates with grippers 117.

*Operation*

When a coin has been dropped through a slot in the vending machine, the coin passes to the coin checker 12 and from there to the coin holder 142. As a result thereof, the balance of the coin scale 136 is disturbed and that side of the scale which was acted upon by the coin will be lowered. During this movement, the cam provided with the rubber cover 140 engages the contact holder 139 thereby establishing connection between the two contact holders 138 and 139. As a result thereof, an electric circuit is closed which actuates the lift magnet or relay 66 and causes the motor 71 to start. The actuation of the relay 66 brings about an upward movement of the pull rod 63 while the arm 68 is tilted upwardly about shaft 69. The motor 71 mounted on the arm 68 will then with its gear 75 engage the gear 77 which will then carry out a turning movement in counterclockwise direction. This brings about a rotative movement of the ratchet wheel 78 so that the pawl 81 moves out of the recess 78 while the cam 83 establishes connection between the contact holders 87 and 88. The contacts of the contact holders 87, 88 are arranged in parallel with the contact holders 138, 139.

The cam disc 79 which is likewise mounted on shaft 76 now being rotated, is rotated in counterclockwise direction. During its movement through the first 90°, the cam disc has no effect because the cam 93 still moves on the lowest portion of the cam disc 79. The crank 80 moves from its position in Fig. 5 toward the left whereby the control arm or control beam 99 is moved downwardly. The spring slide 97 which is connected to shaft 96 is moved in leftward direction on the control beam 99 whereby the tension springs 104 are loaded. As a result thereof, the control beam 99 exerts a pressure upon shaft 106 which connects the control beam 99 with the right-hand holding member 107. Through the intervention of the hinge plate 120 and the pressure member 121, the said pressure is also conveyed to the left-hand holding member 111. Consequently, the two members 123, 130 are pressed against each other and pulled downwardly. During this movement, the bag is cut off by the knife 132a which is adjusted against the thrust of the torsion spring 133 in view of the leftward movement of the spring slide 97. As will be evident from Fig. 7, the cutting knife 132a has reached its left-hand extreme position when the crank 80 is in its horizontal position and the control slide or spring slide 97 is in its left-hand extreme position.

During the further rotative movement of the crank 80, the control beam 99 reaches its lowermost position. The lower end of the gripper 117 then rests behind the abutments 149 thereby preventing the grippers from following the opening movement which is now carried out by the holding members 107, 111. In this way, the bag is detached which due to the fusing easily sticks to the two members 123, 130.

In the lowermost position of the control beam 99, the roller 98 contacts the abutment 105 and with further rotary movement of the crank 80 moves the control beam 99 toward the right whereby the members 123, 130 are opened (Fig. 6). Following a short upward movement of the carriage 108 with the holding members 107, 111, the lower ends of the gripper member 117 leave the abutments 149 and open up in view of the thrust of the springs 119. The bag is now detached and can leave the vending machine through the flap 146 which is opened by the extension 108 of the carriage. During the further upward movement of the carriage 108, the flap 146 is released and closed again by the spring 148.

For further explanation of the individual elements, these elements are again contemplated in their starting position. Due to the closing of the contact holders 138, 139, also a relay 66 was made effective whereby through the intervention of the pull rod 63 also the lever 61, 61a is moved, the adjusting screw of which presses against the bridge member 48, against the thrust of spring 50. The bridge member 48 is pressed in a direction toward the door 3 whereby the longitudinal seam producing member 51 is spaced from the filling pipe 29. Inasmuch as the rod 27 is moved downwardly by means of the pivot 28 on shaft 76, the arm 25 will be tilted. The arm 22 the lower end of which carries a dosing cylinder 18 is tilted toward the left until it will be located above the filling pipe 29. The contents of the dosing cylinder 18 then drop into the hose of packing material through the filling pipe 29, said hose being located between the members 123, 130 and the lower end of said filling pipe and being held in flattened position by the spreader.

When the members 123, 130 occupy their lowest position, the dosing cylinder 18 has returned in its starting position, and the filling of the cylinder can start anew. The arm 22 prevents a bridge formation above the opening 15 on the container bottom.

At the start of the upward movement of the members 123, 130, the cam disc 79 has been rotated to such an extent that the cam 93 has reached the uppermost cam edge. The contacts of the contact holders 90, 91 close whereby the circuit for the heating wires is closed. The heating wires 54, 124 are now heated during the upward movement of the members 123, 130. During the last portion of its upward movement, the control beam 99 moves toward the left because the roller 98 of the crank 80 carries out a leftward movement. However, the abutment 105 still remains in contact with the roller 98 due to the thrust of the tension springs 104. When the carriage 108 is in its uppermost position, the members 123, 130 engage each other whereby the pressure of the springs 104 is conveyed to the members 123, 130 so that the roller 98 leaves the abutment 105. The pawl 81 can now drop into the recess 78a of the ratchet wheel 78 whereby the connection between the contacts of the contact holders 87, 88 is interrupted. Already at an earlier time, namely when the coin has left the coin scale, the engagement between the contacts of the contact holders 138, 139 has been interrupted.

The motor 71 now comes to a standstill and the relay 66 becomes ineffective. Due to the weight of the motor 71, the pull rod 63 drops. As a result thereof, the gear 75 of the motor 71 disengages the gear 77 of shaft 76. Due to the downward movement of the pull rod 63, the bridge member 48 is released, and due to the thrust of the spring 50, the longitudinal seam producing member 51 is again pressed against the filling tube 29. Shortly before this happens, cam 93 again drops to the lowermost edge of the cam disc 79. The contacts of the contact holders 90, 91 are again separated. The heating wires have now reached their highest temperature, and the wrapping material will by means of the members 51 and 123, 130 be fused at two portions.

During the downward movement of the carriage 108, wrapping material is withdrawn from the spool 150 and through the intervention of roller 39 and the member 37 is passed about the filling tube 29 so that one longitudinal edge will protrude beyond the other longitudinal edge for the longitudinal seam to be made. The spreader 38 will assure that the material will be smoothed between the two fusing members 123, 130 which may also be called welding members.

Immediately prior to the downward movement of the members 123, 130, the shaft 106 engages the coin scale 136 and presses the same further downwardly. As a result thereof, the ejector 144 ejects the coin from the coin holder 142. The coin then drops into the coin holder 143. During the upward movement of the carriage 108, the coin scale returns to its position of equilibrium, and the contacts of the contact holders 138, 139 again separate from each other as mentioned above. At this time, the contacts of the contact holders 87, 88 are still in closed position so that the electric circuit feeding relay 66 and electric motor 71 are still closed.

During the course of the cycle of the vending machine, the blocking rod 73 extends into a groove in the coin checker so that a coin dropped into the vending machine during the working cycle will be returned into the return chute. When the frame-shaped arm 68 drops downwardly, shaft 69 and together therewith the blocking rod 73 is tilted whereby the path to the coin holder 142 is again freed for a new coin to be dropped into the vending machine.

It is, of course, to be understood that the present invention is, by no means, limited to the particular construction shown in the drawings but also comprises any modifications within the scope of the appended claims.

What we claim is:

1. In combination in a coin-operable vending machine for dispensing dosed and wrapped material in piece form, in powder form and in liquid form, which includes a reservoir with discharge openings for storing and discharging the material to be dispensed in a container, a dosing mechanism for measuring the unpacked material and feeding means by means of which the packing material is moved into position for being filled with the material to be dispensed: a lifting magnet, a pulling rod operable by said magnet, a member for producing a seam in the packing material to be formed into a container for the material to be dispensed, said member being operable by said pull rod, a tiltably supported motor operatively connected with said pull rod, a shaft rotatably connected to said motor, a dosing cylinder operatively connected with said shaft, members for producing a transverse seal in said container and operatively connected with said shaft, a gripper member, a cutting knife and contact holders for welding wire contacts, said gripper member and said cutting knife and said contact holder being operatively connected with said shaft.

2. A vending machine according to claim 1, which includes a tiltable resilient bridge member and a bell crank lever, and in which the member for producing the longitudinal seam of the container is mounted on said bridge member and is adapted to be adjusted by said pull rod through the intervention of said bell crank lever.

3. A vending machine according to claim 1, which includes a crank connected to said shaft, a roller arranged at the free end of said crank, and a rotatable and longitudinally adjustable control arm, said control arm being operable by said roller.

4. A vending machine according to claim 3, in which said control arm is provided with an abutment adapted to be engaged by said roller to thereby bring about a longitudinal adjustment of said control arm.

5. A vending machine according to claim 3, which includes a cutting knife, in which the control arm has mounted thereon a spring slide operable to move the cutting knife into its cutting position, said spring slide being slidably mounted on said control arm and being connected with a shaft rotatably supporting said roller.

6. A vending machine according to claim 3, which includes a first holding member and an oppositely located second holding member, and in which the free end of said control arm is connected with said first holding member which is reciprocably and tiltably arranged and is hingedly connected to said second holding member.

7. A vending machine according to claim 6, which includes a carriage and gripper members movable from a lowermost into an uppermost position and vice versa, and also includes abutment means, and in which said first and second holding members are mounted on said carriage carrying said gripper members, first spring means being mounted on said holding members and acting on said gripper members, and second spring means connected to said carriage and likewise acting on said gripper members, the lowermost end position of said gripper members being determined by said abutment means.

8. A vending machine according to claim 1, in which the shaft is provided with a pivot arranged at the end of the pull rod adapted to tilt said dosing cylinder.

9. In combination in a coin-operable vending machine for dispensing dosed and wrapped material in piece form, in powder form and in liquid form, which includes a reservoir with discharge openings for storing and discharging the material to be dispensed into a container, a dosing mechanism for measuring the unpacked material, and feeding means by means of which the packing material is moved into position for being filled with the material to be dispensed: a lifting magnet, a pulling rod operable by said magnet, a member for producing a seam in the packing material to be formed into a container for the material to be dispensed, said member being operable by said pull rod, a tiltably supported motor operatively connected with said pull rod, a shaft rotatably connected to said motor, a dosing cylinder operatively connected with said shaft, a filling pipe for passing material to be dispensed from said reservoir to the respective container, said dosing cylinder being tiltably supported between said reservoir and said filling pipe, said filling pipe being offset with regard to the discharge opening of said reservoir, a tiltable shaft extending through said reservoir, and an arm connected to said tiltable shaft for tilting movement with said tiltable shaft, said arm extending through the discharge opening of said reservoir and being connected to said dosing cylinder.

10. A vending machine according to claim 9, which includes a frame member supporting said motor and tiltably supported by said tiltable shaft.

References Cited in the file of this patent

UNITED STATES PATENTS

| | | |
|---|---|---|
| 934,565 | Obermeier | Sept. 21, 1909 |
| 1,986,422 | Zwoyer | Jan. 1, 1935 |
| 2,113,636 | Vogt | Apr. 12, 1938 |
| 2,336,962 | Salfisberg | Dec. 14, 1943 |
| 2,387,812 | Sonneborn et al. | Oct. 30, 1945 |
| 2,572,539 | Thompson | Oct. 23, 1951 |
| 2,817,935 | Fischer et al. | Dec. 31, 1957 |
| 2,826,021 | Van den Berg et al. | Mar. 11, 1958 |